US012116757B2

(12) United States Patent
Villero et al.

(10) Patent No.: US 12,116,757 B2
(45) Date of Patent: Oct. 15, 2024

(54) ANOMALOUS OPERATING CHARACTERISTIC DETECTION SYSTEM, AND ASSOCIATED DEVICES AND METHODS

(71) Applicant: Caterpillar Inc., Peoria, IL (US)

(72) Inventors: David A. Villero, Champaign, IL (US); Kyle J. Cline, Savoy, IL (US)

(73) Assignee: Caterpillar Inc., Peoria, IL (US)

( * ) Notice: Subject to any disclaimer, the term of this patent is extended or adjusted under 35 U.S.C. 154(b) by 325 days.

(21) Appl. No.: 17/588,107

(22) Filed: Jan. 28, 2022

(65) Prior Publication Data

US 2023/0243131 A1    Aug. 3, 2023

(51) Int. Cl.
*E02F 9/26* (2006.01)
*G07C 5/00* (2006.01)
*G07C 5/08* (2006.01)

(52) U.S. Cl.
CPC .............. *E02F 9/267* (2013.01); *G07C 5/006* (2013.01); *G07C 5/0808* (2013.01)

(58) Field of Classification Search
CPC ....... E02F 9/267; G07C 5/006; G07C 5/0808; G07C 3/00; G05B 23/0221; G05B 23/0283; G05B 23/024
See application file for complete search history.

(56) References Cited

U.S. PATENT DOCUMENTS

| | | | |
|---|---|---|---|
| 2010/0100338 A1* | 4/2010 | Vik | G01M 5/0033 702/42 |
| 2019/0294157 A1 | 9/2019 | Miyagi | |
| 2020/0103894 A1* | 4/2020 | Cella | G05B 23/0264 |
| 2020/0348662 A1* | 11/2020 | Cella | G05B 19/41865 |
| 2020/0379454 A1* | 12/2020 | Trinh | G05B 23/024 |
| 2021/0157312 A1* | 5/2021 | Cella | G01M 13/045 |
| 2022/0317676 A1* | 10/2022 | Reaume | G06Q 10/20 |
| 2022/0318829 A1* | 10/2022 | Rai | G06Q 30/0202 |
| 2023/0168961 A1* | 6/2023 | Lin | G05B 23/0281 714/26 |

FOREIGN PATENT DOCUMENTS

WO    2020112337 A1    6/2020

OTHER PUBLICATIONS

Written Opinion and International Search Report for Int'l. Patent Appln. No. PCT/US2023/060085, mailed Apr. 24, 2023 (15 pgs).

* cited by examiner

*Primary Examiner* — Richard M Camby

(57) ABSTRACT

The present technology includes a method for detecting one or more anomalous operating characteristic of an industrial machine. The method can include collecting telematics data indicative of the industrial machine's performance, generating a histogram based on at least a portion of the collected telematics data, applying a histogram comparator engine to the histogram to determine whether the histogram indicates an anomalous operating characteristic, and if the histogram is determined to indicate an anomalous operating characteristic, presenting, to a user, information associated with the anomalous operating characteristic.

17 Claims, 7 Drawing Sheets

ANOMALOUS OPERATING CHARACTERISTIC DETECTION SYSTEM, AND ASSOCIATED DEVICES AND METHODS

TECHNICAL FIELD

The present disclosure relates to detecting anomalous operating characteristics, including anomalous operating characteristic detection systems for industrial machines, and associated systems, devices, and methods.

BACKGROUND

Determining whether a machine requires maintenance can involve analyzing line plots of high frequency sensor data or time series data collected from the machine for anomalous results. These data often include noise introduced by the high frequency sensors or the machine's environment. It can be difficult to differentiate noise from irregularities or inconsistencies in these data that may affect the machine's operation. For example, analyses of these data can often incorrectly identify normal behavior as anomalous, may overlook minor irregularities in the data that indicate anomalous operating behavior of the machine, and can fail to account for a cascading effect where one or more relatively minor irregularities may lead to a machine failure.

SUMMARY

In some embodiments, the present technology includes a method for determining an anomalous operating characteristic using high-frequency sensors of an industrial machine can include collecting, over a time period, telematics data indicative of the industrial machine's performance; generating a histogram based on at least a portion of the telematics data; applying a histogram comparator engine to the histogram to determine whether the histogram indicates an anomalous operating characteristic; and if the histogram is determined to indicate an anomalous operating characteristic, presenting, to a user, information associated with the anomalous operating characteristic. The collected telematics data can be associated with one or more components of the industrial machine and/or with one or more operators of the industrial machine. In some embodiments, the telematics data includes high frequency sensor data. The information presented to the user can include one or more recommendations and/or predictions specific to the industrial machine and/or at least one of the operator of the industrial machine.

In further embodiments, the present technology includes a system for identifying anomalous behavior of a machine. The system can include one or more processors, and one or more memory devices having stored thereon instructions that when executed by the one or more processors, can cause the one or more processors to perform at least one of the following actions: collect telematics data indicative of an industrial machine's performance; generate a histogram based on at least a portion of the telematics data; apply a histogram comparator engine to the histogram to determine whether the histogram indicates an anomalous operating characteristic; and/or if the histogram is determined to indicate an anomalous operating characteristic, present, to a user, information associated with the anomalous operating characteristic. The telematics data can be collected over a time period and/or via one or more high-frequency sensors of the industrial machine, such that the telematics data can include high frequency sensor data. The telematics data can be associated with one or more components of the industrial machine and/or one or more operators of the industrial machine. The information presented to the user can include one or more recommendations and/or or predictions specific to the industrial machine or at least one of the operators of the industrial machine.

In these and other embodiments, the present technology includes one or more non-transitory computer-readable media storing computer-executable instructions that, when executed by one or more processors, cause the one or more processors to perform one or more operations. The one or more operations can include collecting, over a time period, telematics data indicative of the industrial machine's performance; generating a histogram based on at least a portion of the telematics data; applying a histogram comparator engine to the histogram to determine whether the histogram indicates an anomalous operating characteristic; and if the histogram is determined to indicate an anomalous operating characteristic, presenting, to a user, information associated with the anomalous operating characteristic. The collected telematics data can be associated with one or more components of the industrial machine and/or with one or more operators of the industrial machine. In some embodiments, the telematics data includes high frequency sensor data. The information presented to the user can include one or more recommendations and/or predictions specific to the industrial machine and/or at least one of the operator of the industrial machine.

Other aspects of the present technology will appear hereinafter. The features described herein can be used separately or together, or in various combinations of one or more of them.

DETAILED DESCRIPTION

The present disclosure is directed to anomalous operating characteristic detection systems, and associated systems, devices and methods. In the illustrated embodiments herein, anomalous operating characteristic detection systems configured in accordance with the present technology are primarily described in the context of detecting one or more anomalous operating characteristics of an industrial machine, such as one or more anomalous operating characteristics of one or more components of the industrial machine. Anomalous operating characteristic detection systems configured in accordance with various embodiments of the present technology can be incorporated into and/or used to detect one or more anomalous operating characteristics of other machines. Additionally, anomalous operating characteristic detection systems configured in accordance with the present technology can be used to detect anomalous operating characteristics by analyzing telematics data indicative of a given machine's performance and associated with one or more components of the machine, such as high frequency sensor data and/or time series data. In these and other embodiments, anomalous operating characteristic detection systems can make one or more predictions or determinations based at least partially on one or more detected anomalous operating characteristics. Furthermore, a person skilled in the art will understand (i) that the technology may have additional embodiments than those illustrated and described herein with reference to FIGS. 1-7 and (ii) that the technology may be practiced without several of the details of the embodiments described herein with reference to FIGS. 1-7.

Figure 1:
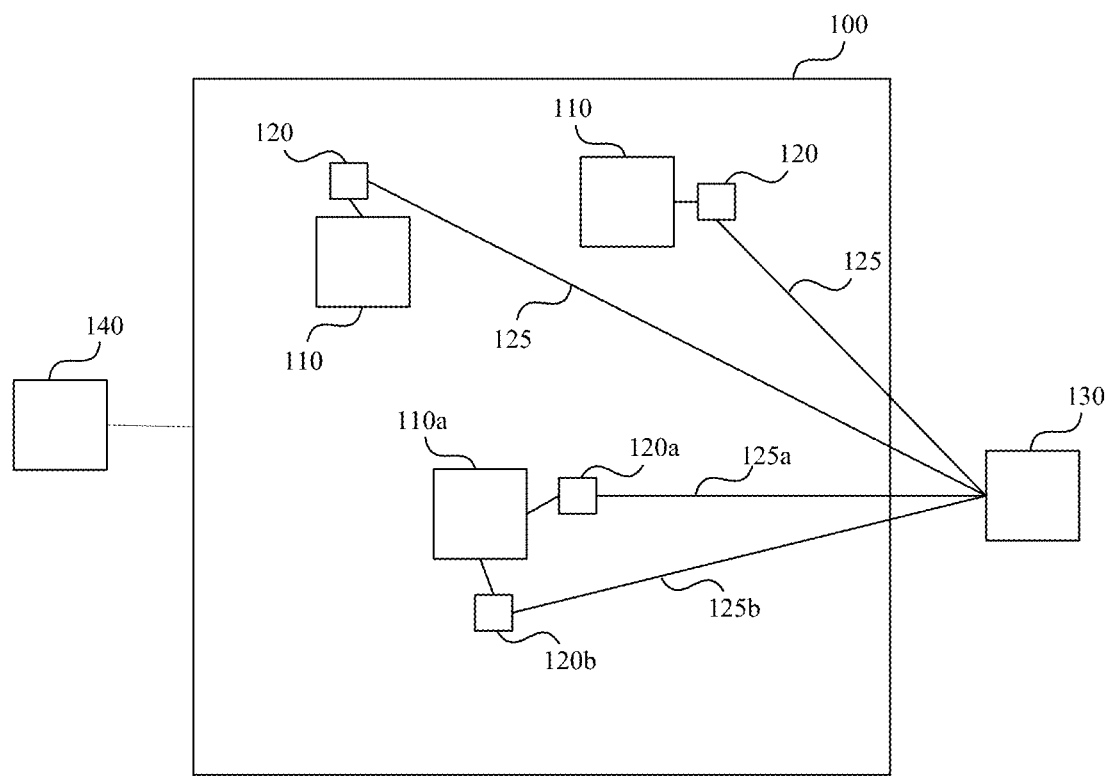
FIG. 1 is a schematic illustration of machine, which includes one or more components functioning together or independently to perform activities associated with the machine in accordance with embodiments of the present technology.

A. Selected Embodiments of Systems and Methods for Determining Anomalous Machine Operating Characteristics, and Associated Systems, Devices, and Methods FIG. 1 is a schematic illustration of a machine 100, which includes one or more components 110 functioning together or independently to perform activities associated with the machine 100. The machine 100 can include a truck, a tracked-type tractor, an excavator, a wheel loader, a front-end loader, a motor grader, a vehicle, an industrial machine, and/or any other suitable machine. The components 110 can include an engine, a transmission, a powertrain, one or more batteries or battery arrays, an aftertreatment system, one or more input devices (such as steering components), one or more tires, one or more tracks, one or more hydraulic systems, and/or any other suitable components 110. The machine 100 and/or the component(s) 110 may exhibit one or more operating characteristics (e.g., an engine speed, a fuel efficiency, a transmission response, etc.) while the machine 100 and/or one or more of the components 100 are operating or otherwise in use (e.g., driving, idling, actuating, moving material, performing a task, etc.). The machine 100 and/or individual ones of the components 100 can be configured with one or more technical or operating specifications (e.g., a max engine speed, a max carry weight, a max tow weight, etc.). For a given machine 100 and/or component 110, one or more of the operating characteristics can be anomalous, e.g., different from an expected or reference operating characteristic. An anomalous operating characteristic can indicate that the given component, machine, and/or another component operably associated with the given component is operating and/or being used outside of the machine/component's technical specifications (e.g., carrying a load heavier than the max carry weight). Additionally, or alternatively, an anomalous operating characteristic can indicate that the machine/component is at least partially damaged, worn, or otherwise not functioning and/or performing as expected. Additionally, or alternatively, an anomalous operating characteristic can indicate the presence of one or more behavioral and/or environmental factors (e.g., weather, location, ground composition, operational style, etc.) that can affect or otherwise alter the function and/or performance of the given component and/or the another component operably associated with the given component. As described in greater detail below, anomalous operating characteristics can be identified my measuring or monitoring the operating characteristics of the machine 100 and/or the components 110, and one or more predictions or determinations related to the machine 100 and/or the component(s) 110 can be based at least partially on the identified anomalous operating characteristics.

In the illustrated embodiment, the machine 100 includes one or more sensors 120 connected to (e.g., operably and/or communicatively coupled to) and/or otherwise arranged to observe the one or more components 110, e.g., to analyze the respective components 110. Each of the sensors 120 can include a temperature sensor, a pressure sensor, an accelerometer, a voltammeter, a strain gauge, a machine payload sensor, and/or any other suitable sensor. Each of the sensors 120 can be configured to detect, receive, and/or otherwise collect telematics data indicative of the machine's performance and associated with the operating characteristics of the corresponding component 110, such as any of the operating characteristics described herein and/or any other suitable operating characteristics, including any operating characteristics associated with damage, wear, weakening, or failure of the components 110. In at least some embodiments, one or more of the sensors 120 can include high frequency sensors (e.g., configured to collect high frequency data associated with the corresponding component 110) and/or time series sensors (e.g., configured to collect time series data associated with the corresponding component 110). In some embodiments, a plurality of sensors can be connected to individual ones of the one or more components 110. In the illustrated embodiment, for example, the machine 100 includes a component 110a connected to a first sensor 120a and a second sensor 120b. The first and second sensors 120a-b can be generally similar to or the same as the sensors 120. The first sensor 120a can provide first sensor data associated with a first operating characteristic of the component 110a, the second sensor 110b can provide second sensor data associated with a second operating characteristic of the component 110, and the first sensor data and first operating characteristic can be different that the second sensor data and second operating characteristic. In at least some embodiments, for example, the component 110a can be an engine of the machine 100, the first sensor 120a can be an engine speed sensor configured to measure engine speed data (e.g., a first operating characteristic of the engine), and the second sensor 120b can be an engine temperature sensor configured to measure engine temperature data (e.g., a second operating characteristic of the engine).

The sensors 120 may include, or may be connected to (e.g., operably, communicatively, etc.), one or more computing devices 130. In the illustrated embodiment, each of the sensors 120 is connected to the computing device(s) 130 by a corresponding communication channel 125 ("the channel(s) 125"). Each of the channels 125 can include a wired communication channel, a wireless communication channel, any communication channel described herein, and/or any other suitable communication channel. Each channel 125 can be associated with a specific one of the sensors 120 and/or a specific operating characteristic of the associated component 110. In the illustrated embodiment, for example, the first sensor 120a of the component 110a is connected to the computing device(s) 130 by a first channel 125a, and the second sensor 120b is connected to the computing device(s) 130 by a second channel 125b. The sensors 120 and the one or more computing devices 130 may work with each other to provide signals or information comprising anomalous component 110 and/or machine 100 operating characteristics, as described in greater detail below.

In these and other embodiments, all or a portion of the telematics data collected by the one or more sensors 120 can be associated with an operator or user 140 of the machine 100. The telematics data can be collected before, during, and/or after the operator uses the machine 100 to perform a task, and the collected telematics data can be associated with a unique identifier corresponding to the operator. The unique identifier include a name, word, number, alphanumeric sequence, and/or any other suitable identifier. In operation, at least one of the one or more computing devices 130 can receive the operator's unique identifier before, during, and/or after the operator 140 uses the machine 100, and can associate at least a portion of the collected telematics data with the operator's unique identifier. If the machine 100 has more than one operator 140, than each of the machine's operators can have a different unique identifier such that the telematics data generated by the various operators can be differentiated and/or sorted by operator (e.g., first telematics data associated with a first operator, second telematics data associated with a second operator, etc.).

Although described with reference to a single machine (the machine 100) in FIG. 1, in other embodiments the present technology can include more machines. In at least some embodiments, for example, the present technology can include at least two, three, four, five, six, seven, eight, nine, ten, or more machines, each of which can be configured generally similar to, the same as, or different than the machine 100 (e.g., including component(s) 110, sensor(s) 120, and/or channel(s) 125). Additionally, one or more of the machines can be connected to the computing device(s) 130, e.g., such that the computing device(s) 130 can collect sensor data for individual ones of the one or more of the machines. In these and other embodiments, the computing devices 130 can aggregate telematics data for a plurality of machines, machine components, operating characteristics, and/or operators, e.g., to generate a library of telematics data. As described in greater detail below, the telematics data collected for a plurality of machines can be used to identify one or more anomalous operating characteristics from a subset of the telematics data associated a machine, one or more components of the machine, and/or an operator of the machine.

Figure 2:
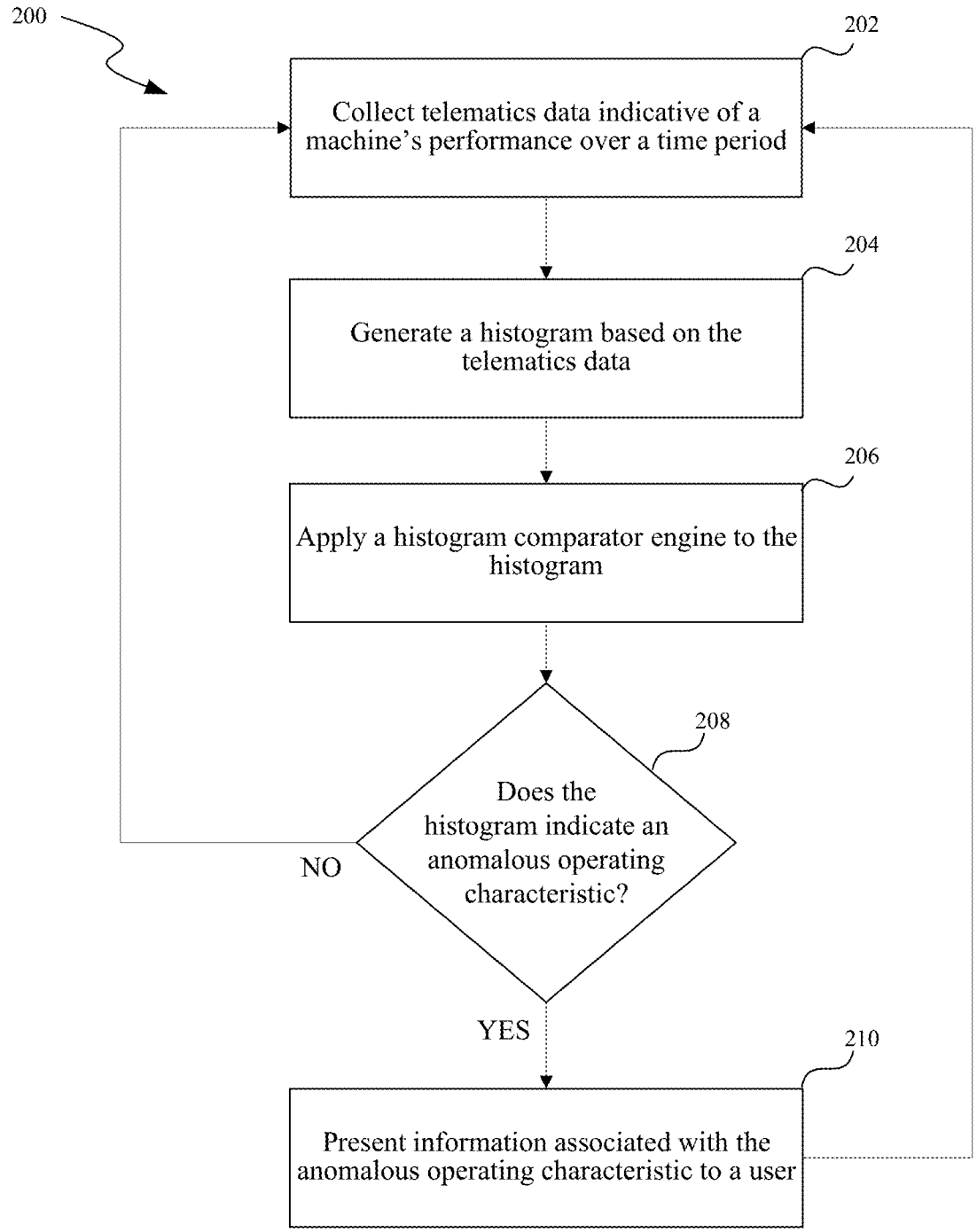
FIG. 2 is a flow diagram illustrating a method for determining anomalous machine operating characteristics in accordance with embodiments of the present technology.

FIG. 2 is a flow diagram illustrating a method 200 for determining (e.g., detecting, identifying, classifying, etc.) one or more anomalous operating characteristics of a machine and/or one or more components of the machine in accordance with embodiments of the present technology. The method 200 is illustrated as a set of blocks, steps, operations, or processes 202-210. All or a subset of the blocks 202-210 can be executed at least in part by various components of anomalous operating characteristic detection system, such as the device 500 of FIG. 5, at least a portion of the environment 600 of FIG. 6, at least one of the elements 700 of FIG. 7, and/or any other suitable device and/or system. Additionally, or alternatively, all or a subset of the blocks 202-210 can be executed at least in part by an operator (e.g., a user, etc.) of the device and/or system. Furthermore, any one or more of the blocks 202-210 can be executed in accordance with the discussion herein.

The method 200 begins at block 202 by collecting telematics data over a time period. Collecting the telematics data can include collecting the telematics data via one or more sensors, such as one or more of the sensors 120 of FIG. 1. In at least some embodiments, collecting the telematics data may include receiving telematics data from the machine 100 and/or one or more components 110 via at least one communication channel, such as at least one of the channels 125 of FIG. 1. Additionally, as described above with reference to FIG. 1, the collected telematics data can be associated with one or more operators of the machine 100.

The telematics data collected in block 202 can be associated with one or more operating characteristics, such as one or more of the operating characteristics of the machine 100 and/or one or more of the components 110 of FIG. 1. In some embodiments, for example, collecting the telematics data can include collecting telematics data associated with one or more of the following operating characteristics of a machine and/or one or more components thereof:
  (i) engine speed;
  (ii) engine load factor;
  (iii) engine response;
  (iv) transmission response;
  (v) engine oil viscosity;
  (vi) fuel consumption rate; and/or
  (vii) any other telematics data associated with the performance of the machine 100 and/or one or more component(s) 110.

Any of the operating characteristics described herein can be collected as high frequency sensor data, time series data, and/or any other suitable form of data associated with the machine 100 and/or the components 110.

In some embodiments, collecting the telematics data over the time period can include collecting the telematics data for at least 30 seconds, 45 seconds, 1 minute, 2 minutes, 3 minutes, 4 minutes, 5 minutes, 10 minutes, 30 minutes, 1 hour, 2 hours, 3 hours, 1 day, 2 days, 3 days, 1 week, 2 weeks, 3 weeks, 1 month, 2 months, 3 months, 1 year, 2 years, any other suitable time period, and/or any other suitable amount there between. In further embodiments, collecting the telematics data over the time period can include collecting the telematics data during all or a portion of one or more active or operating time periods of the machine 100. The one or more operating time periods can include any activity, workflow, operating cycle, and/or use-case involving the machine 100. As a specific example, the machine 100 can be a wheel loader and the operating time period can include all or part of one or more cycles of digging and/or dumping material using the wheel loader. In these and other embodiments, collecting the telematics data over the time period can include collecting the telematics data before, during, and/or after a time or time period in which the machine is used by a given operator or operators. Although block 202 is described in the context of a single machine 100, in other embodiment block 202 can include collecting telematics data from a plurality of machines.

At block 204, the method 200 continues by generating a histogram based at least partially on the telematics data of block 202. The histogram can include a one-dimensional histogram (e.g., representing telematics data collected via any one of the channels 125) or a two-dimensional histogram (e.g., representing telematics data collected via any two of the channels 125). Accordingly, the histogram can be used to represent the any of the telematics data and/or channels 125 associated with the operating characteristics of components 110 and/or the machine 100. In some embodiments, generating the histogram includes generating at least one one-dimensional histogram based at least partially on telematics data associated with an operating characteristic of one of the components 110. For example, generating the histogram can include generating a one-dimensional histogram based at least partially on engine speed data associated with an engine of a machine. As another example, generating the histogram can include generating a one-dimensional histogram of engine load factor data associated with an engine of a machine. In further embodiments, generating the histogram includes generating at least one two-dimensional histogram based at least partially on (i) first telematics data associated with a first operating characteristic of a component and (ii) second telematics data associated with a second operation characteristic of the same component, where the second operating characteristic is different than the first operating characteristics. For example, generating the histogram can include generating a two-dimensional histogram based at least partially on engine speed data and fuel consumption rate data, both of which can be associated with an engine of a machine. In still further embodiments, generating the histogram can include generating at least one two-dimensional histogram based at least partially on (i) first telematics data associated with a first operating characteristic of a first component and (ii) second telematics data associated with a second operating characteristic of a second component, where the second component is different than, but operably and/or functionally associated with, the first component. For example, generating the histogram can include generating a two-dimensional histogram based at least partially on fuel consumption data associated with an engine of a machine and transmission response data associated with a transmission of the machine. In these and other embodiments, generating the histogram can include generating at least one one-dimensional histogram and/or at least one two-dimensional histogram based at least partially on telematics data associated with any one or combination of the operating characteristics described herein. In further embodiments, any of the histograms described herein can be generated based on a subset of the telematics data associated with one or more operators of the machine 100.

In some embodiments, the histogram generated in block 204 can represent at least a portion of the time period during which the telematics data is collected (e.g., block 202). As described previously regarding block 202, in some embodiments, collecting the telematics data over the time period can include collecting the telematics data during all or a portion of one or more active or operating time periods of the machine 100. Accordingly, generating the histogram can include generating a histogram based at least partially on all or a portion of the telematics data collected during one or more active or operational time periods of the machine. In some embodiments generating the histogram includes generating at least one histogram for each of the one or more operational time periods of the machine, e.g., a first histogram for a first operational time period, a second histogram for a second operational time period before (e.g., preceding) or after (e.g., subsequent to) the first operational time period, etc. In these and other embodiments, generating the histogram can include generating a histogram based on an aggregation of the telematics data collected during a plurality of the operational time periods (e.g., the telematics data collected during a plurality of operational time periods within a given day or 24 hour period).

At block 206, the method 200 continues by applying a histogram comparator engines to the histogram generated in block 204 to determine whether the histogram indicates an anomalous operating characteristic. The histogram comparator engine can be configured to analyze the histogram (e.g., the telematics data represented by the histogram and associated with at least one operating characteristic of at least one component of a machine) using one or more models. In at least some embodiments, for example, the histogram comparator engine can include one or more supervised machine learning models, one or more image classification models, such as an Interest Point Local Descriptor (IPLD) image classification algorithm or a simple Support Vector Machine (SVM) image classification algorithm, and/or any other suitable machine learning and/or artificial intelligence models.

In some embodiments, the histogram comparator engine can be configured to generate a reference or baseline histogram. The reference histogram (e.g., a second histogram) can be based at least partially on the histogram (e.g., a first histogram) generated from the collected telematics data (e.g., block 204). For example, the second/reference histogram can be based at least partially on reference data (e.g., a library of telematics data collected for a plurality of machines) associated with one or more machines, components, operating characteristics, operators, and/or time periods, etc. that are generally similar to or the same as the machine represented by the first/collected telematics data histogram. As a specific example, the first histogram (e.g., block 204) can be a one-dimensional histogram of engine speed for a specific machine and a specific operator of the machine, and the second histogram (e.g., block 206) can be a one-dimensional histogram of the engine speed for one or more other operators of the specific machine, for all operators of the specific machine, and/or for a plurality of machines generally similar to or the same as the specific machine (e.g., regardless of the operator(s) of each of the plurality of machines). Accordingly, the histogram comparator engine can aggregate one or more subsets of telematics data from a telematics data library, generate the second/reference histogram based on the aggregated one or more subsets, and compare (via, e.g., one or more of the image classification models) the first histogram to the second histogram to determine whether the first histogram indicates an anomalous operating characteristic of the machine. In some embodiments, the histogram comparator engine image can correlate one or more results from the image classification models with a the Z-statistic value $$\left( Z = \frac{(X_1 - X_2)}{\sqrt{\sigma_{x1}^2 - \sigma_{x2}^2}}, \right.$$

where $X_1$ is the mean of the population (e.g., second/reference) distribution, $X_2$ is the mean of the target (e.g., first) distribution, $\sigma_{x1}^2$ is the standard deviation of the population distribution divided by the square root of the number of points, and $\sigma_{x2}^2$ is the standard deviation of the target distribution divided by the square root of the number of points), where if Z is less than 2, the two distributions are the same, if Z is between 2.0 and 2.5 the two distributions are marginally different (e.g., likely non-anomalous), if Z is between 2.5 and 3.0 the two distributions are significantly different (e.g., likely anomalous) and if Z is greater than 3 the two distributions are highly scientifically different (e.g., very likely anomalous).

At block 208, the method 200 can continue by determining whether the histogram indicates an anomalous operating characteristic. In some embodiments, determining whether the histogram indicates an anomalous operating characteristic can include using the histogram comparator engine (e.g., step 208) to determine whether the histogram (e.g., a telematics data histogram) indicates an anomalous operating characteristic. As described in greater detail below and with reference to FIGS. 3 and 4, the histogram comparator engine can be configured to compare the histogram (e.g., a telematics data histogram based on the telematics data) generated in block 204 with a reference data histogram (e.g., block 206) and, based on the comparison, the histogram comparator engine can be configured to determine whether the telematics data histogram indicates an anomalous operating characteristic.

As described previously, the reference data histogram can be based at least partially on reference data associated with a reference component. The reference component can be generally similar to (e.g., operatively, functionally, structurally, etc.) or the same as the component 110, and/or the reference component can be part of a generally similar, a same, or a different machine as the component 110. In some embodiments, the reference component can be a simulated component, and the reference data can be collected during a simulation (e.g., a computer simulation) involving the reference component. In further embodiments, the reference component can be part of an endurance or test machine, and the reference data can be collected during one or more tests involving the endurance machine, such as one or more tests that include performing one or more activities or operating cycles of the endurance machine and/or operating the endurance machine under one or more ideal conditions. In these and other embodiments, the reference component can be a benchmark component, e.g., corresponding to one or more engineering or design benchmarks for the target component, and the reference data can be set or otherwise determined based on the benchmark(s). The one or more benchmarks can include engine emission levels (e.g., carbon emissions), a fuel efficiency, a machine productivity (e.g., a given machine's production or total operating hours compared to an amount of fuel and/or maintenance required), and/or any other suitable benchmarks. In further embodiments, the reference data histogram can be based on a library of telematics data collected for a plurality of machines and/or an aggregation of one or more subsets of the telematics data from the library of telematics data, as described previously herein.

Additionally, or alternatively, the histogram comparator engine can be configured to compare a first histogram associated with a first operating time period with a second histogram associated with a second operating time period. The first and second histogram can represent telematics data for a same operating characteristic, component, machine, and operator, but the second operating time period can be before or after the first operating time period such that the histogram comparator engine can determine a change in the operating characteristic between the first operating time period and the second operating time period.

Accordingly, if the histogram comparator engine determines that the histogram indicates a normal result (e.g., does not indicate an anomalous result, "NO," etc.), the method 200 can end, or, the method 200 can return to block 202 and continue by repeating one or more of the blocks 202-208.

If the histogram comparator engine determines that the histogram indicates an anomalous operating characteristic (e.g., "YES"), the method 200 can continue to block 210.

In block 210, the method 200 can further include presenting information associated with the anomalous operating characteristic to a user. The information can correspond to at least one of the machines about which the telematics data was collected (e.g., block 202) and/or at least one of the operators associated with the collected telematics data (e.g., block 202). The information can include one or more predictions and/or determinations based at least partially on the determined anomalous operating characteristic of block 208. For example, in at least some embodiments, presenting information associated with the anomalous operating characteristic to the user can include one or more of the following:
- (i) displaying (e.g., to a user) the generated histogram (e.g., step 204) that was determined to indicate the anomalous operating characteristic (e.g., step 208)
- (ii) displaying (e.g., to a user) a comparison of the anomalous histogram and the reference histogram
- (iii) determining a second component operably associated with a first component about which the telematics data was collected (e.g., step 202), identifying the second component to the user, and/or repeating one or more blocks 202-210 of the method 200 for the second component, e.g., to verify the determined anomalous operating characteristic of the first component (e.g., step 208)
- (iv) predicting, based at least in part on the anomalous operating characteristic, a failure mode of the industrial machine, wherein the failure mode relates to at least one component associated with the anomalous operating characteristic
- (v) predicting, based at least in part on the anomalous operating characteristic, a probability of failure of the industrial machine
- (vi) predicting, based at least in part on the anomalous operating characteristic, a probability of future anomalous behavior of the first component Additionally, or alternatively, one or more of the recommendations and/or predictions can be specific to the machine about which the telematics data was collected (e.g., block 202). For example, machine-specific recommendations and/or predictions can include:
- (i) a change to the machine's operator, e.g., so that the operator associated with the telematics data determined to indicate an anomalous operating characteristic (e.g., block 208) is replaced or otherwise does not operate the machine;
- (ii) a predicted usage of the machine associated with the anomalous operating characteristic, and a recommend change to the machine's usage to reduce and/or prevent the anomalous operating characteristic (e.g., if the machine's engine torque is abnormally high, predict the machine is being used to carry a load exceeding the machine's max carry weight, and recommend the machine be used to carry lighter loads);
- (iii) a predicted usage of the machine associated with the anomalous operating characteristic, and a recommendation to stop the predicted usage of the machine;
- (iv) a recommendation to perform maintenance or repair (e.g., early or preventative maintenance/repair) on the machine to at least partially address or otherwise correct the anomalous operating characteristic; and/or
- (v) any other suitable machine-specific recommendations and/or predictions.

In these and other embodiments, one or more of the recommendations and/or predictions can be specific to an operator of the machine associated with the collected telematics data (e.g., block 202). For example, operator-specific recommendations and/or predictions can include:
- (i) a change to the machine's operator, e.g., so that the machine is not operated by the operator associated with the telematics data determined to indicate an anomalous operating characteristic (e.g., block 208);
- (ii) a predicted usage of the machine associated with the anomalous operating characteristic, and a recommendation that the operator use a different/other machine having technical specifications such that the operating characteristics determined to be anomalous for the machine would be normal/not be anomalous for the different/other machine (e.g., if the machine's engine torque is abnormally high, predict the machine is being used to carry a load exceeding the machine's max carry weight, and recommend the operator use a different/other machine configured to carry heavier loads);

(iii) a predicted usage of the machine by the operator and associated with the anomalous operating characteristic, and a recommendation that the operator stop their predicted usage of the machine;

(iv) a predicted usage of the machine by the operator and associated with the anomalous operating characteristic, and a recommendation that the operator change their predicted usage of the machine; and/or (v) any other suitable operator-specific recommendations and/or predictions.

Any of the recommendations and/or predictions described herein can include repeating one or more of blocks 202-208 for another component of the machine, e.g., to confirm or support the determination of the anomalous operating characteristic. For example, the method 200 can further including repeating one or more of blocks 202-208 based at least partially on the information associated with the anomalous operating characteristic (e.g., block 210). In at least some embodiments, for example, the anomalous classification in block 210 can be for a first component and/or a first operating characteristic, and the method 200 can further include collecting telematics data for a second component and/or a second operating characteristic based on the anomalous result of block 210. The second component and/or operating characteristic can be a same or different component and/or operating characteristic than the first component and/or operating characteristic.

Although the steps of the method 200 are discussed and illustrated in a particular order, the method 200 illustrated in FIG. 2 is not so limited. A person of ordinary skill in the relevant art will recognize that the illustrated method 200 can be altered and still remain within these and other embodiments of the present technology. For example, one or more steps of the method 200 (e.g., block 210) illustrated in FIG. 2 can be omitted and/or repeated in some embodiments.

Figure 3:
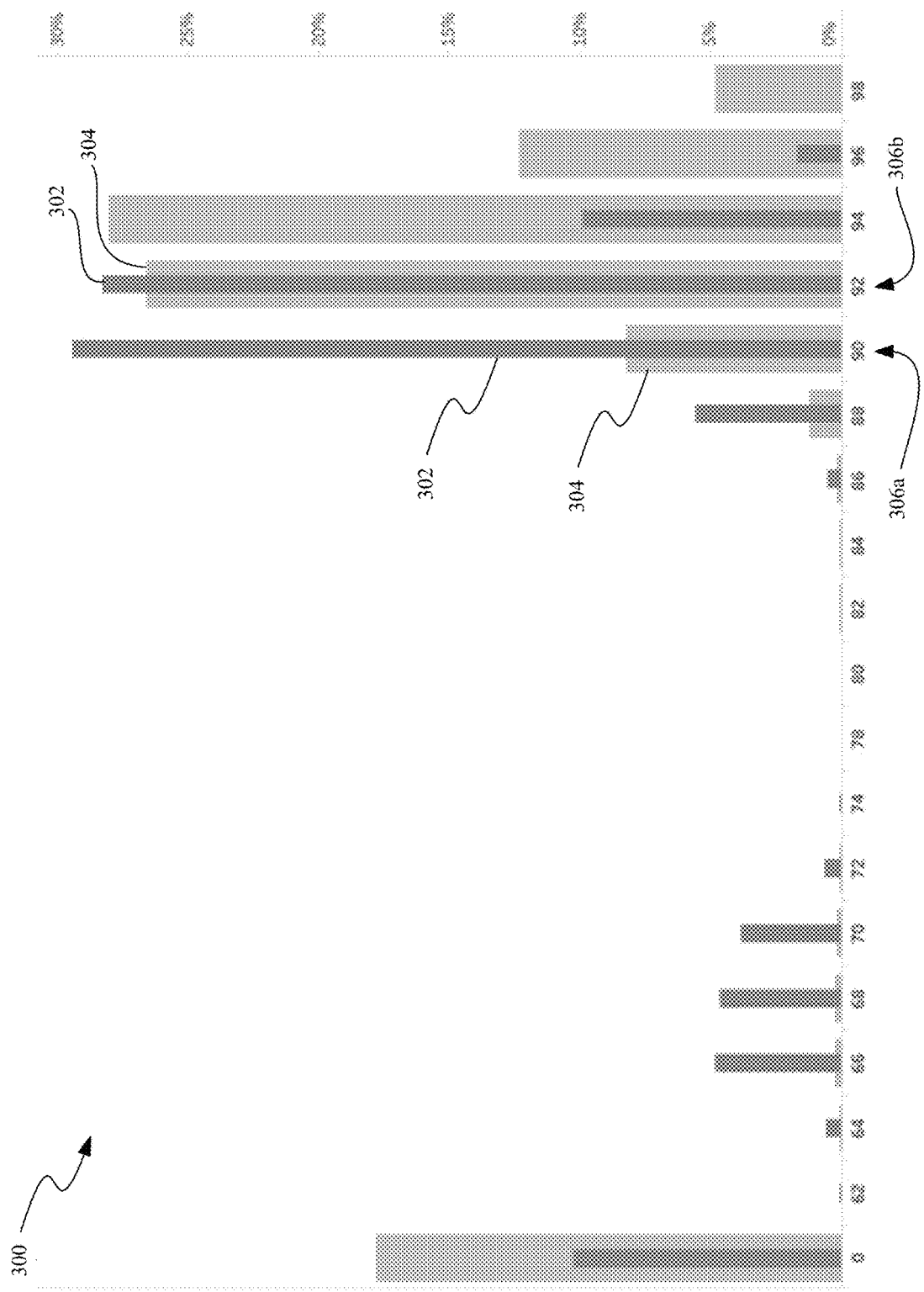
FIG. 3 illustrates a one-dimensional histogram distribution in accordance with embodiments of the present technology.

FIG. 3 illustrates a one-dimensional histogram 300 ("the histogram 300") in accordance with embodiments of the present technology. The histogram 300 can be generated based on telematics data collected for a component (e.g., block 204 of the method 200), such as any of the telematics data and/or components described above. In some embodiments, this can include telematics data associated with one or more of the channels 125, as described previously. In the illustrated embodiment, for example, the histogram 300 includes first data 302 associated with an operating characteristic and second data 304 associated with the same operating characteristic, but for one or more other machines, components, operators, time periods, etc. In at least some embodiments, for example, the first data 302 can include telematics data and the second data 304 can include reference telematics data, e.g., an aggregation of one or more subsets of telematics data collected for a plurality of machines and stored in a library of telematics data.

As described previously and with reference to FIG. 2, the first data 302 can be compared with the second data 304 to determine whether the first data 302 indicates an anomalous operating characteristic. In at least some embodiments, for example, a histogram comparator engine can be applied to the first data 302, as described previously regarding steps 206 and 208 of the method 200. The histogram comparator engine can be configured to determine or classify the first data 302 as anomalous based at least partially on an anomalous value threshold. The anomalous value threshold can be a difference (e.g., between at least a first part of the first data 302 and at least a second, corresponding part of the second data 304) of between about 1% and about 90%, such as at least 1%, 5%, 10%, 20% 25%, 50%, and/or any other suitable difference. For example, the histogram comparator engine can classify the first data 302 as indicating an anomalous operating characteristic when a first part of the first data 302 differs from a second part of the second data 304 by the anomalous value threshold. In the illustrated embodiment, the difference between the first data 302 and the second data 304 in first column 306a can be greater than the anomalous value threshold and can indicate an anomalous operating characteristic of the associated component. Referring again to the illustrated embodiment, the difference between the first data 302 and the second data 304 in second column 306b can be less than the anomalous value threshold and can indicate a normal or expected operating characteristic of the component (e.g., does not indicate an anomalous operating characteristic). In these and other embodiments, anomalous operating characteristics can be determined from any of the histograms described herein using any of the models described previously, and/or any other suitable process or technique known to those of skill in the art.

Figure 4:
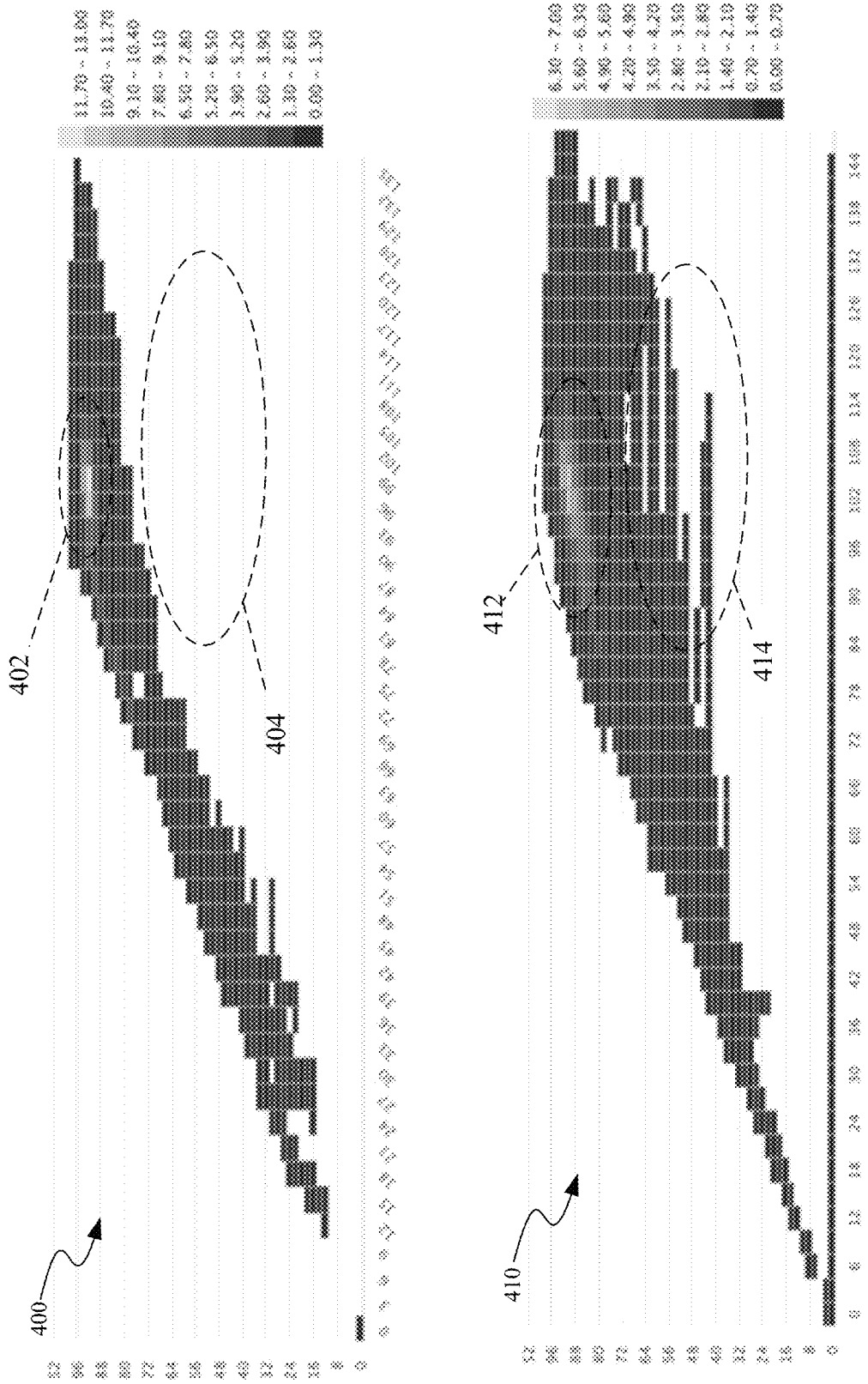
FIG. 4 illustrates multiple two-dimensional histogram distributions in accordance with embodiments of the present technology.

FIG. 4 illustrates a first two-dimensional histogram 400 ("the first histogram 400") and a second two-dimensional histogram 410 ("the second histogram 410") in accordance with embodiments of the present technology. In the illustrated embodiment, the second histogram 410 is a telematics data histogram based at least partially on (i) first telematics data associated with a first operating characteristic of a first component during a first time period and (ii) second telematics data associated with a second operating characteristic of a second component during a second time period. Each of the first operating characteristic, the first component, and/or the first time period can be generally similar to, the same as, or different than the respective second operating characteristic, second component, and/or the second time period. With continued reference to the illustrated embodiment, the first histogram 400 is a reference histogram based at least partially on (i) first reference data associated with the first operating characteristic of the first component during the first time period and (ii) second reference data associated with the second operating characteristic of the second component during the second time period. The first histogram 400 can be compared to the second histogram 410 by one or more histogram comparator engines, and, as described previously, the comparison can be used to determine whether the second histogram 410 indicates the anomalous operating characteristic(s) (e.g., blocks 206 and 208 of the method 200). In some embodiments, comparing the first histogram 400 and the second histogram 410 can include identifying one or more anomalous aspects or regions of the second histogram 410. For example, the histogram comparator engine can be configured to compare a first region 402 of the first histogram 400 with a corresponding (e.g., generally similar or the same) second region 412 of the second histogram 410. In the illustrated embodiment, the second region 412 includes telematics data that are different than the corresponding reference data of the first region 402. Accordingly, the difference between the first region 402 and the second region 412 can indicate one or more anomalous results, (e.g., if the difference is greater than the anomalous value threshold). With continued reference to the illustrated embodiment, a third region 404 of the first histogram 400 can be compared with a corresponding fourth region 414 of the second histogram 410. For example, the fourth region 414 includes telematics data not present in the reference data of the third region 404. Accordingly, the difference between the third region 404 and the fourth region 414 can indicate one or more anomalous results.

Systems and methods for determining anomalous operating characteristics configured in accordance with embodiments of the present technology offer a number of advantages over technologies that are presently available. As described previously, many systems typically analyze telematics data, such as high frequency sensor data and/or time series data. These telematics data often include noise introduced by the sensors and/or the machine's environment, which can make it difficult to accurately detect anomalies (e.g., irregularities, inconsistencies, etc.) in these telematics data. Accordingly, analysis of the telematics data can often incorrectly identify normal or expected behavior as anomalous, may overlook minor irregularities in the data that indicate anomalous operating behavior of the machine, and can fail to account for a cascading effect where one or more minor irregularities may lead to a machine failure. In contrast with many systems, systems and methods configured in accordance with embodiments of the present technology can be relatively insensitive to and/or otherwise unaffected by noise in telematics data, including noise in high frequency sensor data and/or time series data, which is expected to allow for more accurate determinations of anomalous operating characteristics. Moreover, systems and methods configured in accordance with embodiments of the present technology are expected to be able to account for the cascading effects of one or more minor irregularities, and accordingly can lead to more accurate determinations and/or predictions based on the high frequency data and/or time series data. Furthermore, many systems and methods for determining anomalous operating characteristics are based solely on the historical and current state of a single machine, which may bias an expected default machine performance curve based on these data. By comparing data for a given machine with a population of machines in a same (or similar) site or of a same (or similar) class, the systems and methods of the present technology can reduce or eliminate bias, offer a more realistic performance metric, and/or can identify additional reasons for the anomalous behavior, (e.g. behavioral and/or environmental factors such as weather, location, ground composition, operational styles, etc.).

The systems and methods for determining anomalous machine operating characteristics and/or the associated systems, devices, and methods disclosed herein can be embodied as special-purpose hardware (e.g., circuitry), as programmable circuitry appropriately programmed with software and/or firmware, or as a combination of special-purpose and programmable circuitry. Hence, embodiments may include a machine-readable medium having stored thereon instructions which may be used to cause a computer, a microprocessor, processor, and/or microcontroller (or other electronic devices) to perform a process. The machine-readable medium may include, but is not limited to, optical disks, compact disc read-only memories (CD-ROMs), magneto-optical disks, ROMs, random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions.

Figure 5:
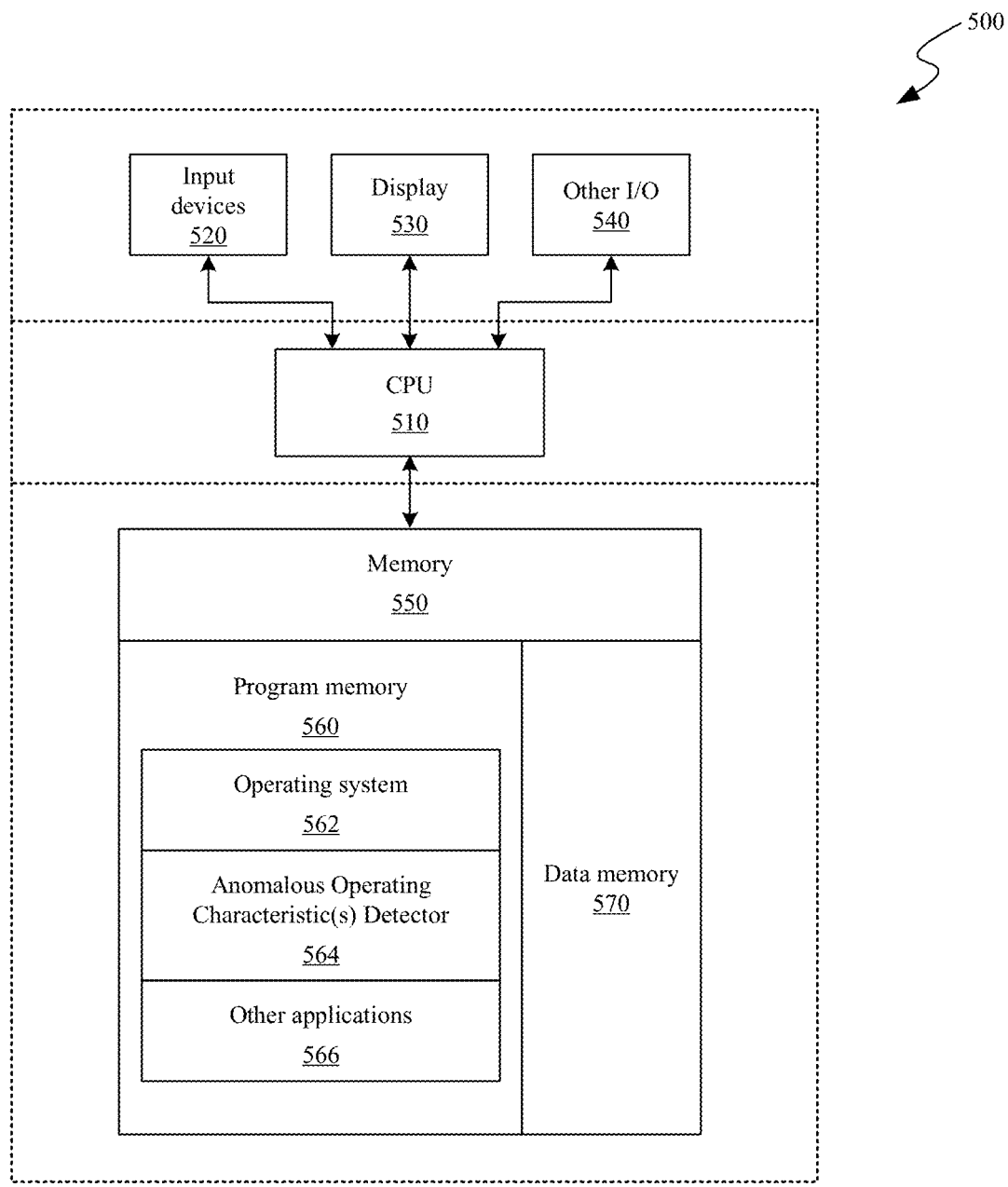
FIG. 5 is a block diagram illustrating an overview of devices on which some implementations can operate.

Several implementations are discussed below in more detail in reference to the figures. FIG. 5 is a block diagram illustrating an overview of devices on which some implementations of the disclosed technology can operate. The devices can comprise hardware components of a system or device 500 that detects, identifies, or otherwise determines anomalous operating characteristics, for example. Device 500 can include one or more input devices 520 that provide input to the CPU (processor) 510, notifying it of actions. The actions are typically mediated by a hardware controller that interprets the signals received from the input device and communicates the information to the CPU 510 using a communication protocol. Input devices 520 include, for example, a mouse, a keyboard, a touchscreen, an infrared sensor, a touchpad, a wearable input device, a camera- or image-based input device, a microphone, or other user input devices.

CPU 510 can be a single processing unit or multiple processing units in a device or distributed across multiple devices. CPU 510 can be coupled to other hardware devices, for example, with the use of a bus, such as a PCI bus or SCSI bus. The CPU 510 can communicate with a hardware controller for devices, such as for a display 530. Display 530 can be used to display text and graphics. In some examples, display 530 provides graphical and textual visual feedback to a user. In some implementations, display 530 includes the input device as part of the display, such as when the input device is a touchscreen or is equipped with an eye direction monitoring system. In some implementations, the display is separate from the input device. Examples of display devices are: an LCD display screen; an LED display screen; a projected, holographic, or augmented reality display (such as a heads-up display device or a head-mounted device); and so on. Other I/O devices 540 can also be coupled to the processor, such as a network card, video card, audio card, USB, FireWire or other external device, sensor, camera, printer, speakers, CD-ROM drive, DVD drive, disk drive, or Blu-Ray device.

In some implementations, the device 500 also includes a communication device capable of communicating wirelessly or wire-based with a network node. The communication device can communicate with another device or a server through a network using, for example, TCP/IP protocols. Device 500 can utilize the communication device to distribute operations across multiple network devices.

The CPU 510 can have access to a memory 350. A memory includes one or more of various hardware devices for volatile and non-volatile storage, and can include both read-only and writable memory. For example, a memory can comprise random access memory (RAM), CPU registers, read-only memory (ROM), and writable non-volatile memory, such as flash memory, hard drives, floppy disks, CDs, DVDs, magnetic storage devices, tape drives, device buffers, and so forth. A memory is not a propagating signal divorced from underlying hardware; a memory is thus non-transitory. Memory 550 can include program memory 560 that stores programs and software, such as an operating system 562, Anomalous Operating Characteristic(s) Detector 564 (which may include instructions for carrying out the methods of determining anomalous operating characteristics disclosed herein), and other application programs 566. Memory 550 can also include data memory 570 that can include database information, etc., which can be provided to the program memory 560 or any element of the device 500.

Some implementations can be operational with numerous other general purpose or special purpose computing system environments or configurations. Examples of well-known computing systems, environments, and/or configurations that may be suitable for use with the technology include, but are not limited to, personal computers, server computers, handheld or laptop devices, cellular telephones, mobile phones, wearable electronics, gaming consoles, tablet devices, multiprocessor systems, microprocessor-based systems, set-top boxes, programmable consumer electronics, network PCs, minicomputers, mainframe computers, distributed computing environments that include any of the above systems or devices, or the like.

Figure 6:
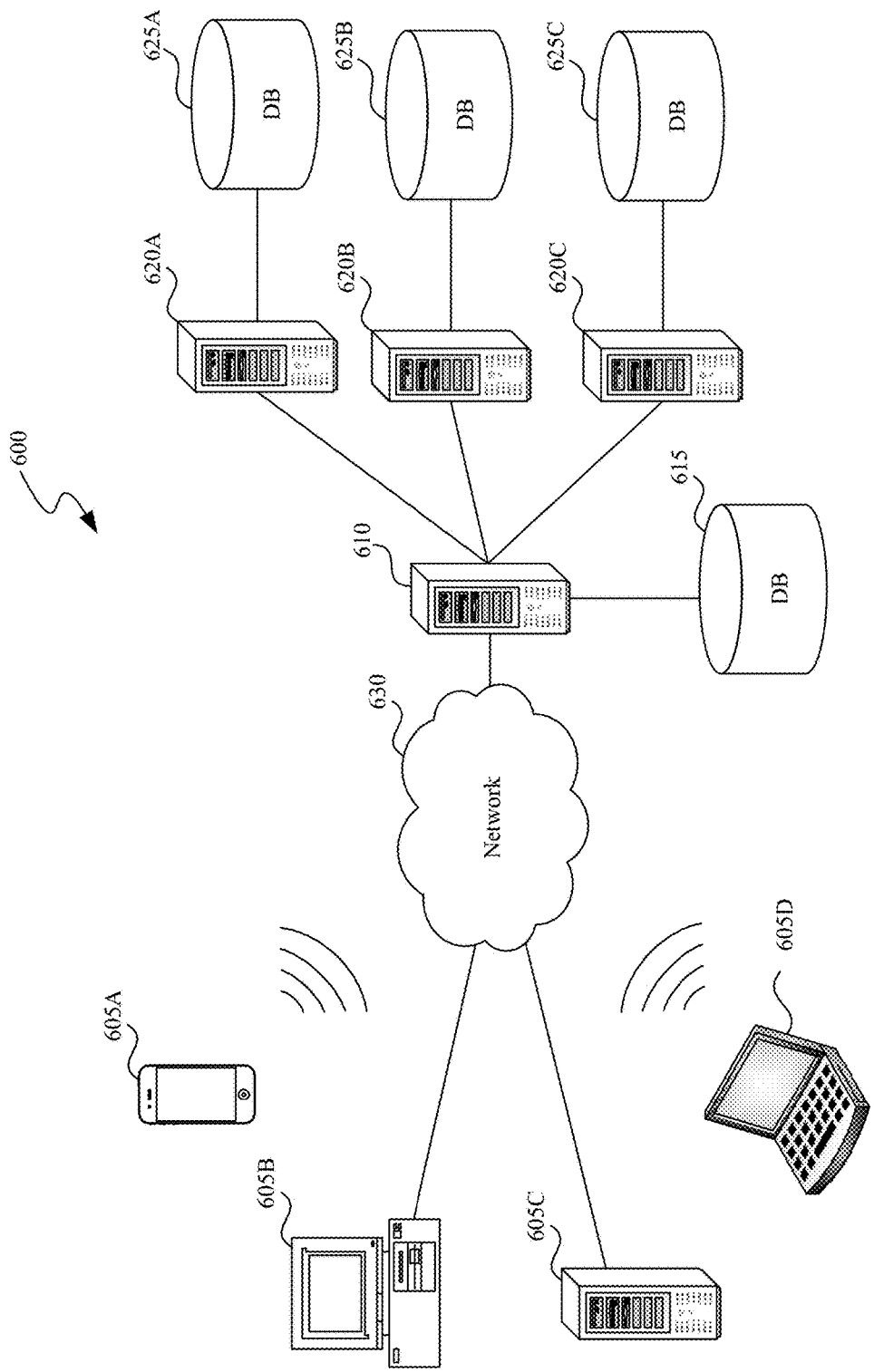
FIG. 6 is a block diagram illustrating an overview of an environment in which some implementations can operate.

FIG. 6 is a block diagram illustrating an overview of an environment 600 in which some implementations of the disclosed technology can operate. Environment 600 can include one or more client computing devices 605A-D, examples of which can include device 500. Client computing devices 605 can operate in a networked environment using logical connections through network 630 to one or more remote computers, such as a server computing device 610.

In some implementations, server computing device 610 can be an edge server that receives client requests and coordinates fulfillment of those requests through other servers, such as servers 620A-C. Server computing devices 610 and 620 can comprise computing systems, such as device 500. Though each server computing device 610 and 620 is displayed logically as a single server, server computing devices can each be a distributed computing environment encompassing multiple computing devices located at the same or at geographically disparate physical locations. In some implementations, each server computing device 620 corresponds to a group of servers.

Client computing devices 605 and server computing devices 610 and 620 can each act as a server or client to other server/client devices. Server 610 can connect to a database 615. Servers 620A-C can each connect to a corresponding database 625A-C. As discussed above, each server 620 can correspond to a group of servers, and each of these servers can share a database or can have their own database. Databases 615 and 625 can warehouse (e.g., store) information. Though databases 615 and 625 are displayed logically as single units, databases 615 and 625 can each be a distributed computing environment encompassing multiple computing devices, can be located within their corresponding server, or can be located at the same or at geographically disparate physical locations.

Network 630 can be a local area network (LAN) or a wide area network (WAN), but can also be other wired or wireless networks. Network 630 may be the Internet or some other public or private network. Client computing devices 605 can be connected to network 630 through a network interface, such as by wired or wireless communication. While the connections between server 610 and servers 620 are shown as separate connections, these connections can be any kind of local, wide area, wired, or wireless network, including network 630 or a separate public or private network.

Figure 7:
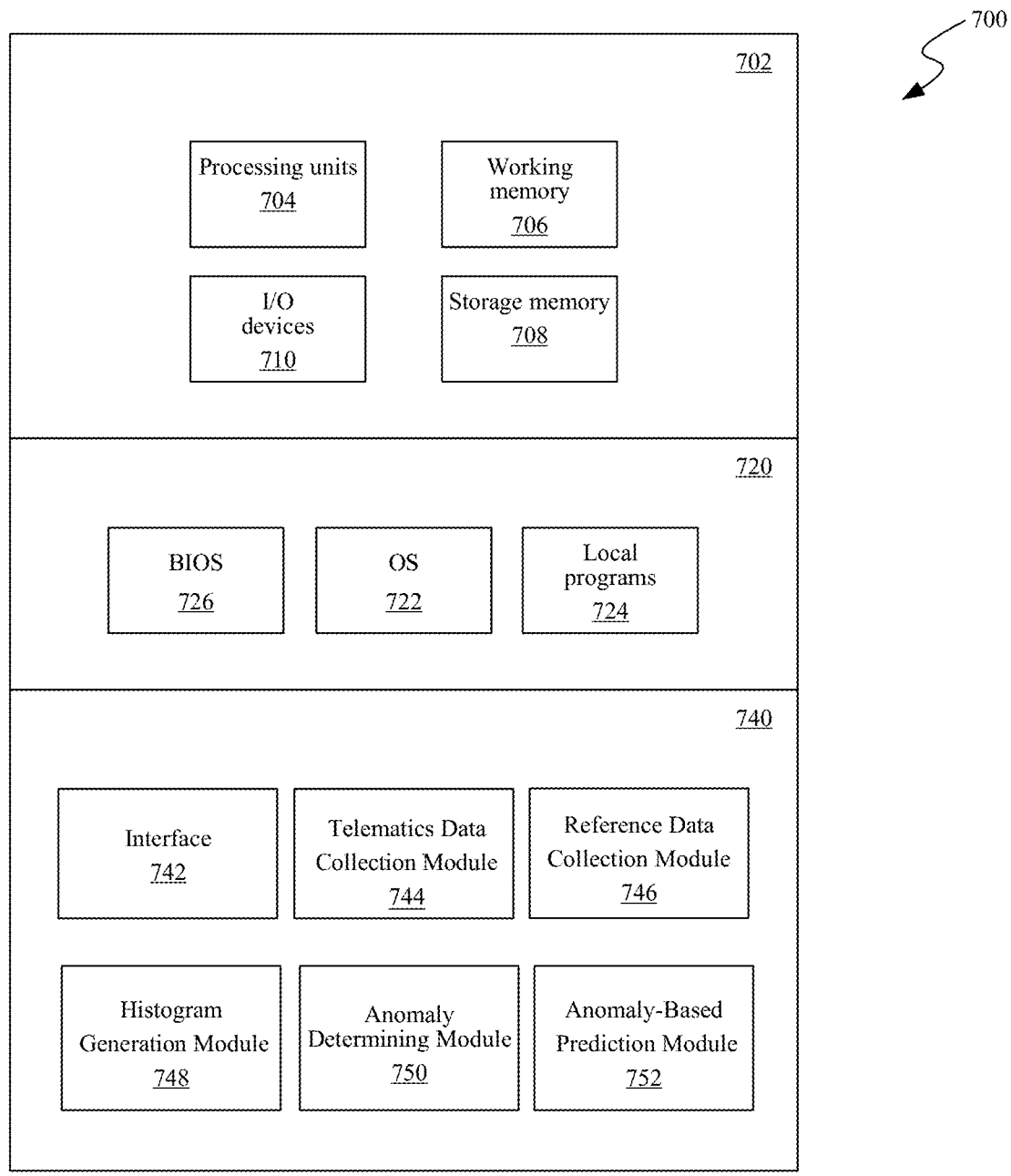
FIG. 7 is a block diagram illustrating elements which, in some implementations, can be used in a system employing the disclosed technology.

FIG. 7 is a block diagram illustrating elements 700 which, in some implementations, can be used in a system employing the disclosed technology. The elements 700 include hardware 702, general software 720, and specialized elements 740. As discussed above, a system implementing the disclosed technology can use various hardware, including processing units 704 (e.g., CPUs, GPUs, APUs, etc.), working memory 706, storage memory 708, and input and output devices 710. Elements 700 can be implemented in a client computing device such as client computing devices 605 or on a server computing device, such as server computing device 610 or 620.

General software 720 can include various applications, including an operating system 722, local programs 724, and a basic input output system (BIOS) 726. Specialized components 740 can be subcomponents of a general software application 720, such as local programs 724, which may include the Anomalous Operating Characteristic(s) Detector 564 (see FIG. 5 and description above). Specialized elements 740 can include a Telematics Data Collection Module 744, a Reference Data Collection Module 746, a Histogram Generation Module 748, an Anomaly Determining Module 750, an Anomaly-Based Prediction Module 752, and components that can be used for transferring data and controlling the specialized components, such as interface 742. In some implementations, elements 700 can be in a computing system that is distributed across multiple computing devices or can be an interface to a server-based application executing one or more of specialized elements 740.

B. Industrial Applicability

In some embodiments, systems for detecting anomalous operating characteristics can include a Telematics Data Collection Module 744, a Reference Data Collection Module 746, a Histogram Generation Module 748, an Anomaly Determining Module 750, and an Anomaly-Based Prediction Module (FIG. 7).

In operation, the Telematics Data Collection Module 744 collects and stores the telematics data (see block 202 in FIG. 2). The Reference Data Collection Module 746 collects and stores reference data. In some embodiments, the Reference Data Collection Module 746 includes one or more simulated components, and can run simulations to generate reference data, as described previously. In these and other embodiments, the Reference Data Collection Module 746 can access a library of telematics data collected for a plurality of machines and identify a subset of the telematics data, e.g., for comparison with the telematics data collected for a given machine, component, operator, etc. The Histogram Generation Module 748 can generate one or more histograms based on the collected telematics data and/or reference data (see blocks 204 and 206 in FIG. 2, and FIGS. 3 and 4).

The Anomaly Determining Module 750 may include the histogram comparator engine(s) and can apply the histogram comparator engine to one or more of the histograms generated by the Histogram Generation Module 548 to determine whether the generated histogram include one or more anomalous operating characteristics. As described previously, in some embodiments the Anomaly Determining Module 750 can include one or more supervised machine learning models, one or more image classification models, and/or any other suitable machine learning and/or artificial intelligence models.

The Anomaly-Based Prediction Module 752 can present information (to, e.g., a user, an operator, etc.) associated with the anomalous operating characteristic. The information can correspond to at least one of the machines about which the Telematics Data Collection Module 744 collected telematics data (e.g., block 202), at least one of the operators associated with the collected telematics data (e.g., block 202), and/or one or more other or reference machines, components, operators, etc. about which the Reference Data Collection Module 746 collected reference data. The information can include one or more predictions and/or determinations based at least partially on operating characteristics determined to be anomalous by the Anomaly Determining Module 750. Additionally, or alternatively, one or more of the recommendations and/or predictions can be specific to the machine about which the telematics data was collected (e.g., block 202). In these and other embodiments, one or more of the recommendations and/or predictions can be specific to an operator of the machine associated with the collected telematics data (e.g., block 202).

General software 720 (see FIG. 7) may include instructions to repeat blocks 202, 204, 206 and/or other blocks of the method 200 (see FIG. 2) at selected increments of time to continually or periodically update the telematics data and/or the histogram(s). In some embodiments, the method 200 may include repeating blocks 202, 204, 206, 208, and/or other blocks based on a determination of an anomalous result (see block 206 in FIG. 2), based on an anomalous classification of the histogram(s) (see block 208 of FIG. 2), and/or based on information associated with the anomalous result (see block 210 of FIG. 2).

The disclosed technology, therefore, provides automatic determination of anomalous operating characteristics of components and/or machines, and can thereby increasing the accuracy with which anomalous operating characteristics are identified in high frequency sensor data and/or time series data. In particular, the disclosed technology can account for noise in high frequency sensor data and/or time series data from sensors and/or the environment when determining whether telematics data indicates one or more anomalous operating characteristics.

C. Conclusion

From the foregoing, it will be appreciated that specific embodiments of the technology have been described herein for purposes of illustration, but well-known structures and functions have not been shown or described in detail to avoid unnecessarily obscuring the description of the embodiments of the technology. To the extent any materials incorporated herein by reference conflict with the present disclosure, the present disclosure controls. Where the context permits, singular or plural terms can also include the plural or singular term, respectively. Moreover, unless the word "or" is expressly limited to mean only a single item exclusive from the other items in reference to a list of two or more items, then the use of "or" in such a list is to be interpreted as including (a) any single item in the list, (b) all of the items in the list, or (c) any combination of the items in the list. As used herein, the phrase "and/or" as in "A and/or B" refers to A alone, B alone, and both A and B. Where the context permits, singular or plural terms can also include the plural or singular term, respectively. Additionally, the terms "comprising," "including," "having" and "with" are used throughout to mean including at least the recited feature(s) such that any greater number of the same feature and/or additional types of other features are not precluded.

Furthermore, as used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result. Moreover, the terms "connect" and "couple" are used interchangeably herein and refer to both direct and indirect connections or couplings. For example, where the context permits, element A "connected" or "coupled" to element B can refer (i) to A directly "connected" or directly "coupled" to B and/or (ii) to A indirectly "connected" or indirectly "coupled" to B.

The above detailed descriptions of embodiments of the technology are not intended to be exhaustive or to limit the technology to the precise form disclosed above. Although specific embodiments of, and examples for, the technology are described above for illustrative purposes, various equivalent modifications are possible within the scope of the technology, as those skilled in the relevant art will recognize. For example, while blocks are presented in a given order, alternative embodiments can perform blocks in a different order. As another example, various components of the technology can be further divided into subcomponents, and/or various components and/or functions of the technology can be combined and/or integrated. Furthermore, although advantages associated with certain embodiments of the technology have been described in the context of those embodiments, other embodiments can also exhibit such advantages, and not all embodiments need necessarily exhibit such advantages to fall within the scope of the technology.

The headings provided herein are for convenience only and do not necessarily affect the scope of the embodiments. Further, the drawings have not necessarily been drawn to scale. For example, the dimensions of some of the elements in the figures may be expanded or reduced to help improve the understanding of the embodiments. Moreover, while the disclosed technology is amenable to various modifications and alternative forms, specific embodiments have been shown by way of example in the drawings and are described in detail below. The intention, however, is not to unnecessarily limit the embodiments described. Rather, the embodiments are intended to cover all modifications, combinations, equivalents, and alternatives falling within the scope of this disclosure.

It should also be noted that other embodiments in addition to those disclosed herein are within the scope of the present technology. For example, embodiments of the present technology can have different configurations, components, and/or procedures in addition to those shown or described herein. Moreover, a person of ordinary skill in the art will understand that these and other embodiments can be without several of the configurations, components, and/or procedures shown or described herein without deviating from the present technology. Accordingly, the disclosure and associated technology can encompass other embodiments not expressly shown or described herein.

Reference in this specification to "one embodiment" or "an embodiment" means that a particular feature, structure, or characteristic described in connection with the embodiment is included in at least one embodiment of the disclosure. The appearances of the phrase "in one embodiment" (or the like) in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. It will be appreciated that the same thing can be said in more than one way. Consequently, alternative language and synonyms may be used for any one or more of the terms discussed herein, and any special significance is not to be placed upon whether or not a term is elaborated or discussed herein. Synonyms for some terms are provided. A recital of one or more synonyms does not exclude the use of other synonyms. The use of examples anywhere in this specification, including examples of any term discussed herein, is illustrative only and is not intended to further limit the scope and meaning of the disclosure or of any exemplified term. Likewise, the disclosure is not limited to various embodiments given in this specification. Unless otherwise defined, all technical and scientific terms used herein have the same meaning as commonly understood by one of ordinary skill in the art to which this disclosure pertains. In the case of conflict, the present document, including definitions, will control.

We claim:

1. A method for determining an anomalous operating characteristic using high-frequency sensors of an industrial machine, the method comprising:
   using the high-frequency sensors disposed at the industrial machine and communicatively coupled to a computing system, collecting, over a time period, telematics data indicative of the industrial machine's performance, the telematics data associated with a first component of the industrial machine and an operator of the industrial machine, the telematics data including high frequency sensor data;
   using at least a portion of the telematics data, the at least a portion comprising two or more of an engine speed, an engine load factor, and a fuel consumption rate, generating, at the computing system, a multi-dimensional histogram;
   applying a histogram comparator engine to the multi-dimensional histogram to determine whether the multi-dimensional histogram indicates an anomalous operating characteristic;
   if the multi-dimensional histogram is determined to indicate an anomalous operating characteristic, generating, at the computing system, and presenting via a display device of the computing system, to a user, electronic information associated with the anomalous operating characteristic, wherein the electronic information includes a recommendation or prediction specific to the industrial machine or the operator of the industrial machine.

2. The method of claim 1 wherein the recommendation or prediction specific to the industrial machine includes one or more of the following:
   a first recommendation to change the industrial machine's operator;
   a predicted usage of the industrial machine associated with the anomalous operating characteristic and at least one of:
      a second recommendation to change the industrial machine's predicted usage to reduce or prevent the anomalous operating characteristic; and
      a third recommendation to stop the predicted usage of the industrial machine; and
      a fourth recommendation to perform maintenance or repair on the industrial machine to at least partially address or otherwise correct the anomalous operating characteristic.

3. The method of claim 1 wherein the recommendation or prediction specific to the operator of the industrial machine includes one or more of the following:
   a first recommendation to replace the operator operating the industrial machine;
   a first predicted usage of the industrial machine associated with the anomalous operating characteristic, and a second recommendation that the operator use a different industrial machine having technical specifications such that the operating characteristics determined to be anomalous for the industrial machine would be normal for the different industrial machine; and
   a second predicted usage of the industrial machine by the operator based at least partially on the anomalous operating characteristic, and at least one of:
      a third recommendation that the operator stop their predicted usage of the industrial machine; and
      a fourth recommendation that the operator change their predicted usage of the industrial machine.

4. The method of claim 1 wherein applying the one or more histogram comparator engines includes comparing the multi-dimensional histogram to the reference histogram, wherein the reference histogram is based on reference data associated with a second component.

5. The method of claim 4 wherein the time period is a first time period, the reference data is collected over a second time period before the first time period, and the first and second components are a same component.

6. The method of claim 1 wherein the telematics data is first telematics data and the industrial machine is a first industrial machine, the method further comprising collecting second telematics data for a plurality of second industrial machines, wherein the histogram comparator engine is configured to compare at least a portion of the second telematics data with the first telematics data to determine whether the first telematics data indicates the anomalous operating characteristic of the first industrial machine.

7. The method of claim 6 wherein the operator is a first operator associated with at least a first portion of the first telematics data, the method further comprising one or more second operators, each second operator associated with a respective second portion of the first telematics data, wherein the histogram comparator engine is configured to compare the first portion of the first telematics data with one or more of the second portions of the first telematics data and/or the second telematics data to determine whether the first portion of the first telematics data indicates the anomalous operating characteristic of the first industrial machine.

8. A system for identifying anomalous behavior of an industrial machine, comprising:
   one or more processors; and
   one or more memory devices having stored thereon instructions that when executed by the one or more processors cause the one or more processors to:
      collect, over a time period and via one or more high-frequency sensors of the industrial machine communicatively coupled to the system, telematics data indicative of the industrial machine's performance, the telematics data associated with a first component of the industrial machine and an operator of the industrial machine, the telematics data including high frequency sensor data;
      using at least a portion of the telematics data, the at least a portion comprising two or more of an engine speed, an engine load factor, and a fuel consumption rate, generate a multi-dimensional histogram;

apply a histogram comparator engine to the multi-dimensional histogram to determine whether the multi-dimensional histogram indicates an anomalous operating characteristic; and if the multi-dimensional histogram is determined to indicate an anomalous operating characteristic, generate and present, to a user and via a display device, electronic information associated with the anomalous operating characteristic, wherein the electronic information includes a recommendation or prediction specific to the industrial machine or the operator of the industrial machine.

9. The system of claim 8 wherein the recommendation or prediction specific to the industrial machine includes one or more of the following:
a first recommendation to change the industrial machine's operator;
a predicted usage of the industrial machine associated with the anomalous operating characteristic and at least one of:
a second recommendation to change the industrial machine's predicted usage to reduce or prevent the anomalous operating characteristic; and
a third recommendation to stop the predicted usage of the industrial machine; and
a fourth recommendation to perform maintenance or repair on the industrial machine to at least partially address or otherwise correct the anomalous operating characteristic.

10. The system of claim 8 wherein the recommendation or prediction specific to the operator of the industrial machine includes one or more of the following:
a first recommendation to replace the operator operating the industrial machine;
a first predicted usage of the industrial machine associated with the anomalous operating characteristic, and a second recommendation that the operator use a different industrial machine having technical specifications such that the operating characteristics determined to be anomalous for the industrial machine would be normal for the different industrial machine; and
a second predicted usage of the industrial machine by the operator based at least partially on the anomalous operating characteristic, and at least one of:
a third recommendation that the operator stop their predicted usage of the industrial machine; and
a fourth recommendation that the operator change their predicted usage of the industrial machine.

11. The system of claim 8 wherein the telematics data is first telematics data and the industrial machine is a first industrial machine, the instructions further causing the one or more processors to collect second telematics data for a plurality of second industrial machines, wherein the histogram comparator engine is configured to compare at least a portion of the second telematics data with the first telematics data to determine whether the first telematics data indicates the anomalous operating characteristic of the first industrial machine.

12. The system of claim 11 wherein the operator is a first operator associated with at least a first portion of the first telematics data, the instructions further causing the one or more processors to execute one or more second operators, each second operator associated with a respective second portion of the first telematics data, wherein the histogram comparator engine is configured to compare the first portion of the first telematics data with one or more of the second portions of the first telematics data and/or the second telematics data to determine whether the first portion of the first telematics data indicates the anomalous operating characteristic of the first industrial machine.

13. One or more non-transitory computer-readable media storing computer-executable instructions that, when executed by one or more processors, cause the one or more processors to perform operations comprising:
using high-frequency sensors disposed at an industrial machine and communicatively coupled to a computing system, collecting, over a time period, telematics data indicative of the industrial machine's performance, the telematics data associated with a first component of the industrial machine and an operator of the industrial machine, the telematics data including high frequency sensor data;
using at least a portion of the telematics data, the at least a portion comprising two or more of an engine speed, an engine load factor, and a fuel consumption rate, generating, at the computing system, a multi-dimensional histogram;
applying a histogram comparator engine to the multi-dimensional histogram to determine whether the multi-dimensional histogram indicates an anomalous operating characteristic; and
if the multi-dimensional histogram is determined to indicate an anomalous operating characteristic, generating, at the computing system, and presenting via a display device of the computing system, to a user, electronic information associated with the anomalous operating characteristic, wherein the electronic information includes a recommendation or prediction specific to the industrial machine or the operator of the industrial machine.

14. The one or more non-transitory computer-readable media of claim 13 wherein the recommendation or prediction specific to the industrial machine includes one or more of the following:
a first recommendation to change the industrial machine's operator;
a predicted usage of the industrial machine associated with the anomalous operating characteristic and at least one of:
a second recommendation to change the industrial machine's predicted usage to reduce or prevent the anomalous operating characteristic; and
a third recommendation to stop the predicted usage of the industrial machine; and
a fourth recommendation to perform maintenance or repair on the industrial machine to at least partially address or otherwise correct the anomalous operating characteristic.

15. The one or more non-transitory computer-readable media of claim 13 wherein the recommendation or prediction specific to the operator of the industrial machine includes one or more of the following:
a first recommendation to replace the operator operating the machine;
a first predicted usage of the industrial machine associated with the anomalous operating characteristic, and a second recommendation that the operator use a different industrial machine having technical specifications such that the operating characteristics determined to be anomalous for the industrial machine would be normal for the different industrial machine; and
a second predicted usage of the industrial machine by the operator based at least partially on the anomalous operating characteristic, and at least one of:

a third recommendation that the operator stop their predicted usage of the industrial machine; and a fourth recommendation that the operator change their predicted usage of the industrial machine.

16. The one or more non-transitory computer-readable media of claim 13 wherein the telematics data is first telematics data and the industrial machine is a first industrial machine, the instructions further comprising collecting second telematics data for a plurality of second industrial machines, wherein the histogram comparator engine is configured to compare at least a portion of the second telematics data with the first telematics data to determine whether the first telematics data indicates the anomalous operating characteristic of the first industrial machine.

17. The one or more non-transitory computer-readable media of claim 16 wherein the operator is a first operator associated with at least a first portion of the first telematics data, the instructions further comprising one or more second operators, each second operator associated with a respective second portion of the first telematics data, wherein the histogram comparator engine is configured to compare the first portion of the first telematics data with one or more of the second portions of the first telematics data and/or the second telematics data to determine whether the first portion of the first telematics data indicates the anomalous operating characteristic of the first industrial machine.

\* \* \* \* \*